June 8, 1937.   D. R. KNAPP   2,083,451
ANIMAL TRAP
Filed May 18, 1936
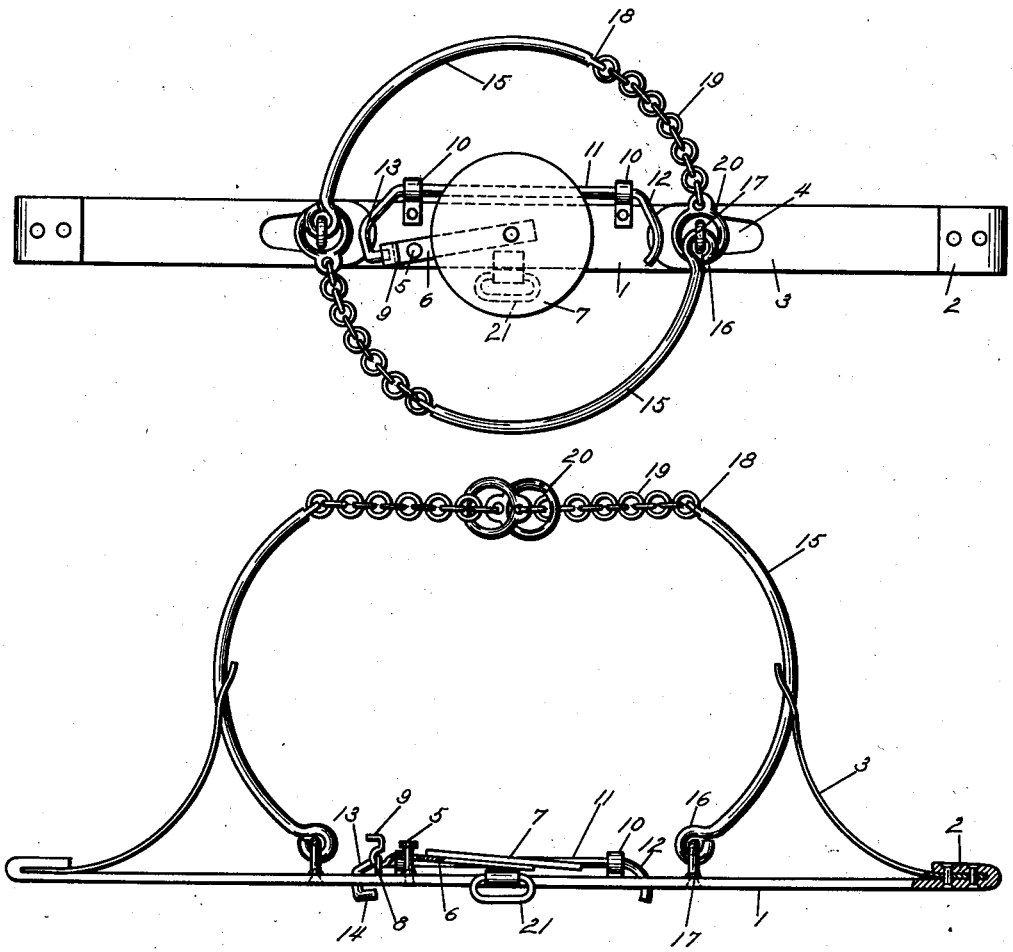
Dewey Ralph Knapp
INVENTOR
BY Victor J. Evans & Co.
ATTORNEYS Patented June 8, 1937

2,083,451

UNITED STATES PATENT OFFICE 2,083,451

ANIMAL TRAP

Dewey R. Knapp, Plattsburg, N. Y.

Application May 18, 1936, Serial No. 80,429

6 Claims. (Cl. 43—87)

This invention relates to animal traps, and its general object is to provide a trap of the spring jaw type that is not only capable of performing its intended function of catching and holding animals in a more effective manner, than traps of the same type now in general use, but will do so in a humane manner, in that by the use of my trap the liability of causing pain or injury to the animal is materially overcome if not entirely eliminated, due to the use of flexible means in the jaw structure.

A further object of the invention is to provide an animal trap of the character set forth, that is simple in construction, inexpensive to manufacture, easy to set, and extremely efficient in use, operation and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a top plan view of the trap which forms the subject matter of the present invention, in set position.

Figure 2 is a side elevation of the trap, showing the arrangement of the parts after being sprung.

Referring to the drawing in detail, the reference numeral 1 indicates the base of my trap which as shown is an elongated strip of sufficient length and width to render the trap self-supporting in an upright position, as shown, and the ends of the strip are crimped upon themselves to provide clamps 2 that have secured therein by rivets or the like one of the ends of leaf springs 3 arranged for disposal in superimposed relation with respect to the base strip and adjacent the opposite ends of the springs are slots 4 which are arranged longitudinally therein, as best shown in Figure 1. The slotted or inner ends of the springs 3 are slightly curved, thence outwardly flared as will be noted upon inspection of Figure 2.

Fixed to and rising from the base strip and preferably adjacent one edge and beyond the transverse center thereof is a headed pin or post 5 which has mounted thereon the trigger arm or catch 6 for the pan 7, the arm 6 being secured to the under side of the pan and extending therefrom, with a slot therein to receive the post 5, and the arm outwardly of the slot is looped upon itself, with the looped portion received in a connecting member 8 that is preferably swiveled to the base strip and from the looped portion the arm 6 extends into a hook 9.

Extending laterally from one side edge of the base strip 1 is a pair of strap brackets 10 which have mounted for rotation therein the setting lever 11, one end of which extends in curved formation as at 12 and the opposite end portion is inclined at an angle from the body portion as at 13 and terminates in an inwardly directed finger 14 arranged for disposal in the path of the hook 9 to contact the under surface thereof for holding the pan in set position.

The respective end portions 12 and 13 act to hold the springs 3 in set position, as best shown in Figure 1, as the springs normally tend to assume the position shown in Figure 2 for disposing the strap from a set position to a sprung position.

The jaws of my trap are extremely important, and each jaw includes a relatively stiff arcuate section 15 preferably formed from steel and being round in cross section as shown. The sections 15 have one of their ends rolled upon themselves to provide eyes 16 mounted in eyed members 17 secured to the base strip upon opposite sides of the pan, as best shown in Figure 2, and the sections 15 are curved toward each other from their connection with the base strip, and terminate at their outer ends in apertured ears 18 which have one of the ends of flexible sections 19 secured thereto, while the opposite ends of the flexible sections which are shown as chains, have connected thereto rings 20 mounted on and surrounding the sections 15 for running engagement therewith as well as with opposed chain sections, as will be obvious upon inspection of Figure 1, therefore it will be seen that when the trap is sprung the chains and rings cooperate with each other to provide a noose that sets up a clamping contact with the leg or other part of an animal caught by the trap.

The slots of the springs 3 receive the sections 15 when the trap is sprung, and tend to hold them away from each other, as shown in Figure 2, and consequently the noose in binding engagement with the part of the animal caught therein.

When the trap is set, the end portions of the lever 11 are disposed in engagement with the inner ends of the springs 3, and the finger 14 is arranged to contact the under surface of the hook 9, with the sections 15 extending upon opposite sides of the base strip 1, and with the rings 20 received by the eyed members 17 and resting on the springs 3, as well as with the flexible or chain sections 19 arranged in arcuate formation, so that the sections 15 and 19 present a complete circle as shown in Figure 1. It will of course be understood that the bait is disposed on or secured to the pan in the usual manner.

With the trap in set position, assuming that an animal should use its paw to remove the bait from the pan, such action will tilt the pan downwardly as shown in Figure 2, and result in releasing the setting lever from the spring 3 which will spring upwardly and carry the sections 15 accordingly and cause the rings 20 to travel along the sections 15 as well as the flexible or chain sections 19 and thereby provide the noose which is drawn in binding engagement with the animal's paw as will be apparent. Due to the flexible or chain sections 19, and their cooperative association, in providing the noose, it will be obvious that it is practically impossible for my trap to break the animal's leg or to cause pain or otherwise injure the animal, and it is likewise practically impossible for the animal to escape from the noose.

The base strip 1 has secured thereto a bail member 21 for the connection of an anchor chain thereto whereby the trap can be anchored to suitable means.

While it has been stated that the bait is disposed on or secured to the pan, such is not generally the case when the trap is used for catching large animals, as in that event the bait is very seldom fastened to the pan but is usually placed above the trap or adjacent thereto in such a manner that while the animal is trying to get the bait or is eating it, the animal will step on the trap and is caught, it being understood that the trap is usually concealed, or covered by sand, loose dirt, dead leaves and the like. My trap is designed in such a manner that it sets very flat and is easy to conceal, and notwithstanding the fact that it is buried, it is capable of throwing the noose upwardly about the animal's leg, and thereby assuring what may be termed a positive catch. If the traps of this character that are now generally employed are covered or concealed they will not work effectively, but my trap is capable of performing its intended function of catching an animal under practically all conditions and in a positive, yet humane manner.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. An animal trap comprising a base, jaw means including arcuate portions connected to the base and flexible portions connected to the arcuate portions and cooperatively associated to provide a noose, spring means secured to the base and being slotted to receive the arcuate portions for actuating the jaw means from set to noose forming position, means for holding the spring means under tension with the jaw means in set position, and animal actuated releasable means including bait supporting means and engageable with the holding means to hold the latter against the spring means.

2. An animal trap comprising a base, jaw means including arcuate sections having one of their ends loosely connected to the base and flexible sections connected to the arcuate sections, said flexible sections having running engagement with the arcuate sections and with each other to provide a noose, spring means having one of their ends secured to the base and their opposite end portions slotted for the passage of the arcuate sections therethrough for actuating the jaw means from set to noose forming position, means for holding the spring means under tension with the jaw means in set position, and animal actuated releasable means engageable with the holding means to hold the latter against the spring means.

3. An animal trap comprising an elongated base, jaw means including relatively stiff arcuate sections having one of their ends connected to the base, flexible sections having one of their ends connected to the opposite ends of the arcuate sections, rings on the opposite ends of the flexible sections and received by the arcuate sections for running engagement therewith and the flexible sections respectively to provide a noose, spring means for actuating the jaw means from set to noose forming position, means for holding the spring means under tension with the jaw means in set position, and animal actuated releasable means including a bait pan and engageable with the holding means to hold the latter against the spring means.

4. An animal trap comprising a base, jaw means connected to the base and including flexible sections cooperatively associated to provide a noose, leaf springs having one of their ends fixed to the base and their opposite end portions being slotted for the passage of the jaw means therethrough to actuate the latter from set to noose forming position, setting means rockably secured to the base and having end portions engageable with the spring means for holding the latter under tension with the jaw means in set position, a bait pan, trigger means secured to the bait pan and swivelly connected to the base and said trigger means engageable with the setting means to hold the latter against the spring means.

5. An animal trap comprising a base, jaw means connected to the base and including relatively stiff arcuate sections and flexible sections connected to the arcuate sections, rings connected to the flexible sections and having running engagement with the arcuate sections and the flexible sections to provide a noose, said arcuate sections being movable for disposal upon opposite sides of the base with the flexible sections arranged therewith to provide a complete circle when the jaw means is in set position, spring means for carrying the arcuate sections from their first mentioned position to an upright position for disposing the flexible sections in noose forming position, means for holding the spring means under tension with the jaw means in set position, and animal actuated releasable means engageable with the holding means to hold the latter against the spring means.

6. An animal trap comprising a base, jaw means connected to the base and including relatively stiff arcuate sections and flexible sections connected to the arcuate sections, rings connected to the flexible sections and having running engagement with the arcuate sections and the flexible sections to provide a noose, said arcuate sections being movable for disposal upon opposite sides of the base with the flexible sections arranged therewith to provide a complete circle when the jaw means is in set position, spring means for carrying the arcuate sections from their first mentioned position to an upright position for disposing the flexible sections in noose forming position, and animal releasable means for holding the spring means under tension with the jaw means in set position.

DEWEY R. KNAPP.